United States Patent
Petkov et al.

(10) Patent No.: US 9,151,774 B2
(45) Date of Patent: Oct. 6, 2015

(54) READOUT CIRCUIT FOR SELF-BALANCING CAPACITOR BRIDGE

(75) Inventors: Vladimir Petkov, Mountain View, CA (US); Ganesh Balachandran, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 627 days.

(21) Appl. No.: 13/551,753

(22) Filed: Jul. 18, 2012

(65) Prior Publication Data

US 2013/0049776 A1    Feb. 28, 2013

Related U.S. Application Data

(63) Continuation of application No. 13/220,306, filed on Aug. 29, 2011, now Pat. No. 8,854,062.

(51) Int. Cl.
*G01R 27/26* (2006.01)
*G01P 15/125* (2006.01)
*G01L 1/14* (2006.01)
*G01D 5/24* (2006.01)

(52) U.S. Cl.
CPC ............... *G01P 15/125* (2013.01); *G01D 5/24* (2013.01); *G01L 1/144* (2013.01); *Y10T 29/4913* (2015.01)

(58) Field of Classification Search
CPC ........................................................ G01B 1/00
USPC .................................................. 324/658–690
See application file for complete search history.

(56) References Cited

U.S. PATENT DOCUMENTS

2005/0218911 A1 * 10/2005 Denison ........................ 324/661

* cited by examiner

*Primary Examiner* — Vincent Q Nguyen
(74) *Attorney, Agent, or Firm* — Maginot Moore & Beck LLP

(57) ABSTRACT

A capacitive transducer and a readout circuit for processing a signal from a capacitive transducer. The readout circuit includes a high gain circuit element, two summing amplifiers and two feedback path. The high gain circuit element generates an amplified transducer signal, and the summing amplifiers sum the amplified transducer signal with a positive reference voltage and the negative reference voltage, respectively, to generate a first summation signal and a second summation signal. The feedback paths feed back the summation signals to the transducer. Output circuitry generates an output signal based on the summation signals. The high gain circuit element can be a switched capacitor integrator. The output circuitry can generates the output signal based on the first and second summation signals.

20 Claims, 5 Drawing Sheets

READOUT CIRCUIT FOR SELF-BALANCING CAPACITOR BRIDGE

CROSS REFERENCE TO RELATED APPLICATIONS

This application is a continuation of U.S. patent application Ser. No. 13/220,306, filed on Aug. 29, 2011, entitled "Readout Circuit for Self-Balancing Capacitor Bridge," which is incorporated herein by reference.

BACKGROUND OF THE INVENTION

This patent relates to capacitive transducers, and more particularly to techniques for attenuation of unwanted disturbances in capacitive transducers.

Transducers convert a general physical quantity (for example, acceleration, pressure, etc.) to quantities that can be processed by electronic circuits. In particular, capacitive transducers produce a change of capacitance, corresponding to the magnitude of the measured input signal. Readout circuits for capacitive transducers transform the capacitance change produced by the transducer to an electrical signal. In the process, the circuits apply voltage waveforms to the transducer electrodes.

A capacitive accelerometer, a capacitive transducer for measuring acceleration, includes a mechanical sensing element and a readout circuit. FIG. 1 illustrates an exemplary embodiment of a mechanical sensing element 100 of a capacitive accelerometer. In this embodiment, the mechanical sensing element 100 includes a mass 102 suspended between a first spring 104 and a second spring 106, a first electrode 110 and a second electrode 112. A proximal end of the mass 102 is coupled to the first spring 104 and a distal end of the mass 102 is coupled to the second spring 106. The first spring 104 has two ends; a first end coupled to the proximal end of the mass 102 and a second end coupled to a substrate. The second spring 106 has two ends; a first end coupled to the distal end of the mass 102 and a second end coupled to the substrate. A common electrode 108 is coupled to the mass 102 and moves with the mass 102 relative to the substrate. The first and second electrodes 110, 112 are stationary relative to the substrate. In this embodiment a positive reference voltage $V_S$ is applied to the first electrode 110 and the negative reference voltage $-V_S$ is applied to the second electrode 112. A first variable capacitor $C_1$ is formed between the first electrode 110 and the common electrode 108, and a second variable capacitor $C_2$ is formed between the second electrode 112 and the common electrode 108.

In this embodiment, when the system is at rest, there is a substantially equal nominal gap $g_0$ between the first electrode 110 and the common electrode 108 and between the second electrode 112 and the common electrode 108, creating substantially equal capacitances in the first variable capacitor $C_1$ and the second variable capacitor $C_2$. An input acceleration moves the mass 102 relative to the substrate which varies the gaps between the electrodes and varies the capacitance of the variable capacitors $C_1$, $C_2$. Acceleration in the direction of arrow 120 deflects the mass 102 a distance $\Delta x$ that is proportional to the input acceleration. This movement of the mass 102 increases the distance between the first electrode 110 and the common electrode 108 to $g_0+\Delta x$, and decreases the distance between the second electrode 112 and the common electrode 108 to $g_0-\Delta x$, which changes the capacitance of capacitors $C_1$ and $C_2$. The capacitance C of variable capacitors $C_1$ and $C_2$ can be determined by:

$$C_{1/2} = \frac{\varepsilon_0 A}{g_0 \pm \Delta x} \quad (1)$$

where $\varepsilon_0$ is dielectric permittivity, A is the area of the capacitive plates (which extend into the paper), $g_0$ is the nominal gap and $\Delta x$ is the displacement due to the acceleration. The readout circuit determines the value of $\Delta x$ based on the capacitance change in capacitors $C_1$ and $C_2$.

FIG. 2 is a schematic of an exemplary embodiment of a self-balancing capacitive bridge 200. The switched-capacitor implementation shown in FIG. 2 has the advantage of straightforward DC biasing of the input without the need for a high resistance path, as well as a stable and well-defined transfer function over process and temperature. It also provides a discrete-time output signal, which can be digitized directly by an analog-to-digital converter (ADC). FIG. 2 shows a single-ended embodiment of a self-balancing bridge.

The self-balancing bridge 200 includes a sensor core 210 with two variable capacitors, $C_1$ and $C_2$, and a readout or interface circuit 220. The sensor core 210 represents a capacitive sensor element, for example the sensing element 100 shown in FIG. 1 or one of various other capacitive sensor elements known in the art.

The readout circuit 220 includes a forward path that passes the output of the sensor core 210 through an integrator 222, which provides gain, to the output $V_O$. In this embodiment, the integrator 222 includes an amplifier 224 with an integrating capacitor $C_i$. The inverting input of the amplifier 224 is coupled to the common node M between the variable capacitors $C_1$ and $C_2$, the non-inverting input of the amplifier 224 is coupled to ground, and the output of the amplifier 224 provides the output voltage $V_o$. The integrating capacitor $C_i$ couples the inverting input of the amplifier 224 to the output of the amplifier 224.

The self-balancing bridge 200 also includes a first feedback path 230 and a second feedback path 240 that feedback the output voltage $V_o$ to the sensor core 210. The first feedback path 230 feeds back the output voltage $V_o$ through a first inverting amplifier 232 to a first summing node 234. The first summing node 234 sums the inverted output voltage $-V_0$ and inverted reference voltage $-V_S$, and outputs the resulting voltage $-V_S-V_0$ to the first variable sensor capacitor $C_1$. The second feedback path 240 feeds back the output voltage $V_o$ through a second inverting amplifier 242 to a second summing node 244. The second summing node 244 sums the inverted output voltage $-V_0$ and reference voltage $V_S$, and outputs the resulting voltage $V_S-V_0$ to the second variable sensor capacitor $C_2$.

The self-balancing bridge 200 tries to equalize the absolute charge on the two sensor capacitors, $C_1$ and $C_2$. Under these conditions the output voltage is proportional to the ratio between the difference and the sum of the measured capacitors:

$$V_o = -V_S \frac{C_1 - C_2}{C_1 + C_2} \quad (2)$$

Measuring the above ratio is of interest for a variety of applications, acceleration sensors being only one particular example.

In addition to producing the result in Eq. (2), equalizing the absolute charge on the transducer capacitors has the advantage of creating equal electrostatic forces, acting on the moving plates of the variable capacitors, $C_1$ and $C_2$, in opposite directions. The net force on the transducer is reduced; hence the interface circuit does not disturb the measurement by inducing spurious deflection of the capacitor plates. In order for this condition to be fulfilled, however, the absolute charge on the transducer capacitors must be maintained equal at any given point of time. Implementing the summing nodes to simply equalize the time-average charge on the transducer capacitors does not maintain equal charge at all times during operation. Applying the same absolute voltage to the sensor capacitors results in different absolute charges, and therefore different electrostatic forces when $C_1$ and $C_2$ are different. The charge balance is achieved only on average, which does not result in zero net force. Using active summing circuits for the summing amplifiers 234, 244 helps maintain the correct voltage for equalizing the charge on $C_1$ and $C_2$.

However, it is well known that amplifiers introduce disturbances, such as noise and offset, to the signals they process. While switched-capacitor techniques such as Correlated Double-Sampling (CDS) can eliminate low-frequency noise and offset, the broad-band noise, which is aliased near DC by the sampling process, cannot be rejected. Furthermore, CDS roughly doubles the amount of broad-band noise, which appears near DC. It would be desirable to attenuate these unwanted disturbances so that they have reduced impact on the output measurement of the circuit.

SUMMARY OF THE INVENTION

A readout circuit is disclosed for processing a transducer signal from a capacitive transducer and producing a circuit output signal. The readout circuit includes a high gain circuit element, two summing amplifiers implemented by active circuitry, two feedback paths and output circuitry. The high gain circuit element receives the transducer signal and generates an amplified transducer signal. The first summing amplifier sums the amplified transducer signal with a positive reference voltage and generates a first summation signal. The second summing amplifier sums the amplified transducer signal with a negative reference voltage and generates a second summation signal. The negative reference voltage has substantially the same magnitude but opposite polarity of the positive reference voltage. The first feedback path feeds back the first summation signal to the capacitive transducer, and the second feedback path feeds back the second summation signal to the capacitive transducer. The output circuitry generates the circuit output signal based on the first summation signal and the second summation signal. The high gain circuit element can be a switched capacitor integrator. Each of the first and second summing amplifiers can include an operational amplifier, and the input signals to the summing amplifier can be coupled to the inverting input of the respective operational amplifier. The readout circuit can also include an inverting amplifier that inverts the amplified transducer signal. The output circuitry can generate the circuit output signal as the average of the first summation signal and the second summation signal.

A readout circuit is disclosed for processing a transducer signal from a capacitive transducer and producing a circuit output signal, where the readout circuit includes a forward path and two feedback paths. The forward path includes a high gain circuit element and two summing amplifiers. The high gain circuit element receives the transducer signal and generates an amplified transducer signal. The summing amplifier sums the amplified transducer signal with a reference voltage and generates a summation signal. The first summing amplifier sums the amplified transducer signal with a positive reference voltage and generates a first summation signal. The second summing amplifier sums the amplified transducer signal with a negative reference voltage and generates a second summation signal. The negative reference voltage has substantially the same magnitude but opposite polarity of the positive reference voltage. The first feedback path feeds back the first summation signal to the capacitive transducer, and the second feedback path feeds back the second summation signal to the capacitive transducer. Output circuitry generates the circuit output signal based on the summation signals. The high gain circuit element can be a switched capacitor integrator. The summing amplifier can include an operational amplifier. At least one of the summing amplifiers can be implemented by active circuitry. The readout circuit can also include an inverting amplifier that inverts the amplified transducer signal. The output circuitry can generate the circuit output signal as the average of the first and second summation signals.

A capacitive transducer system is disclosed that includes a capacitive sensing element, a high gain circuit element, first and second summing amplifiers, first and second feedback paths and output circuitry. The capacitive sensing element generates a transducer signal based on a physical quantity. The high gain circuit element receives the transducer signal and generates an amplified transducer signal. The first summing amplifier, implemented by active circuitry, sums the amplified transducer signal with a reference voltage and generates a first summation signal. The second summing amplifier, implemented by active circuitry, sums the amplified transducer signal with a negative reference voltage and generates a second summation signal. The negative reference voltage has substantially the same magnitude but opposite polarity of the reference voltage. The first feedback path feeds back the first summation signal to the capacitive sensing element. The second feedback path feeds back the second summation signal to the capacitive sensing element. The output circuitry generates a circuit output signal based on the first summation signal and the second summation signal. The high gain circuit element can be a switched capacitor integrator. The system can also include an inverting amplifier that inverts the amplified transducer signal. The output circuitry can generate the circuit output signal as the average of the first and second summation signals. The capacitive sensing element can include a sensor core including a first variable capacitor having a first movable capacitive plate and a second variable capacitor having a second movable capacitive plate, where the first movable capacitive plate is coupled to the second movable capacitive plate.

The capacitive transducer system can be a fully differential system where the capacitive sensing element includes first and second capacitive cores, and differential signals are generated. The transducer signal includes a first transducer signal generated by the first capacitive core and a second transducer signal generated by the second capacitive core. The amplified transducer signal is based on the first and second transducer signals. The first feedback path feeds back the first summation signal to the first capacitive core and to the second capacitive core. The second feedback path feeds back the second summation signal to the first capacitive core and to the second capacitive core. The capacitors of the first and second capacitive cores can be tuned to react substantially identically.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
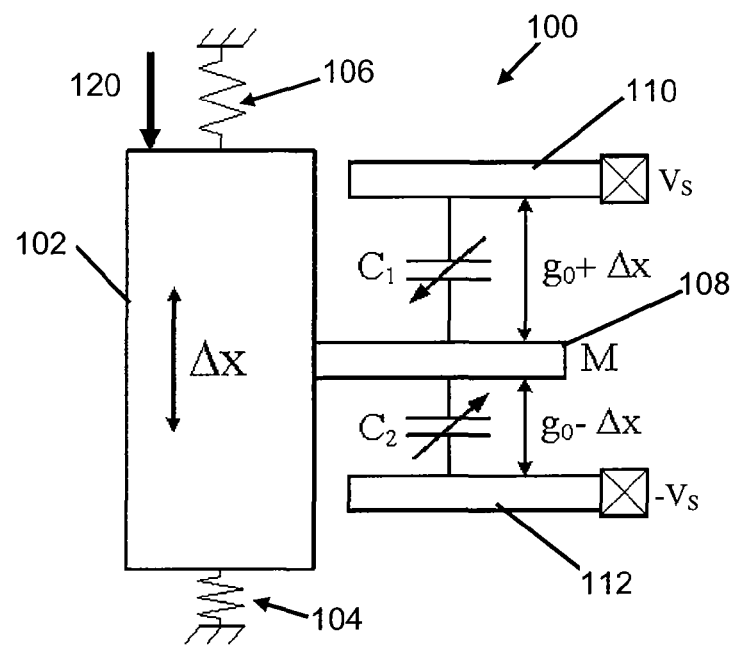
FIG. 1 illustrates an exemplary embodiment of a mechanical sensing element of a capacitive transducer.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF EXEMPLARY EMBODIMENTS

Figure 2:
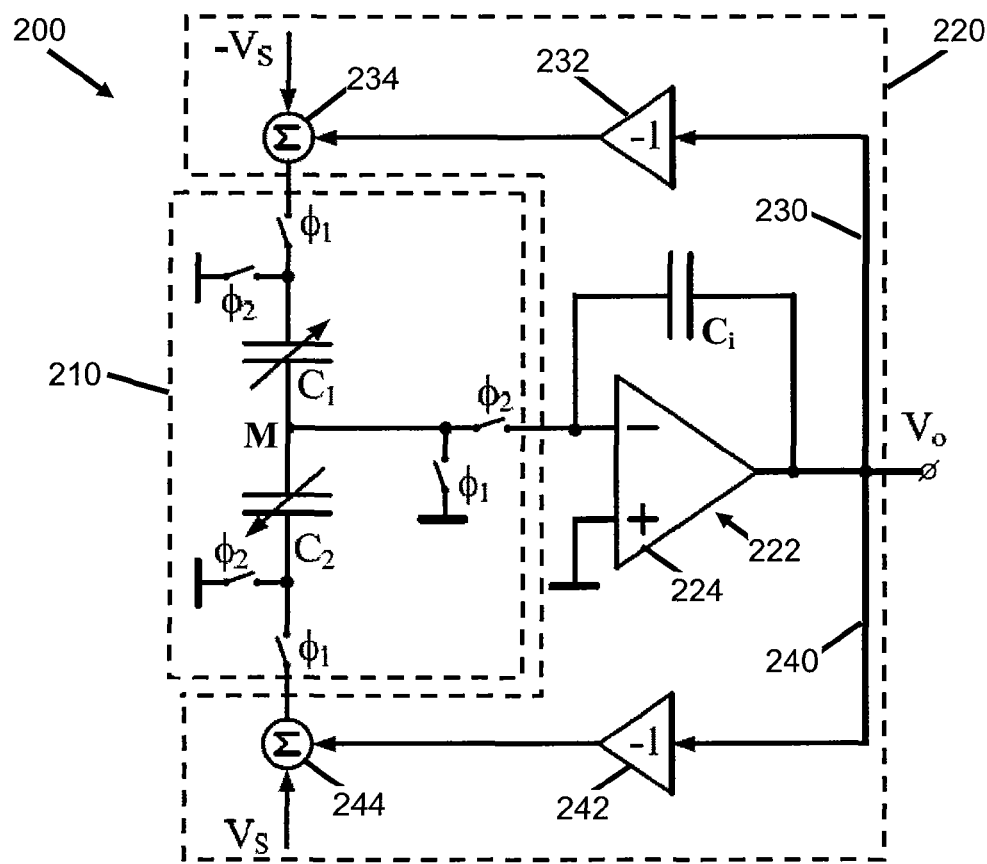
FIG. 2 is a schematic of an exemplary embodiment of a self-balancing capacitive bridge.

Using active circuits to implement the summing nodes in FIG. 2 provides better equalization of the absolute charge on the transducer capacitors $C_1$ and $C_2$, which reduces the impact of the readout or interface circuit on the sensor. However, using active amplifiers for implementing the summing nodes introduces unwanted disturbances, noise and offset, to the signals they process. Attenuating the disturbances introduced by the active amplifiers reduces the impact of these disturbances on the output signal.

Figure 3:
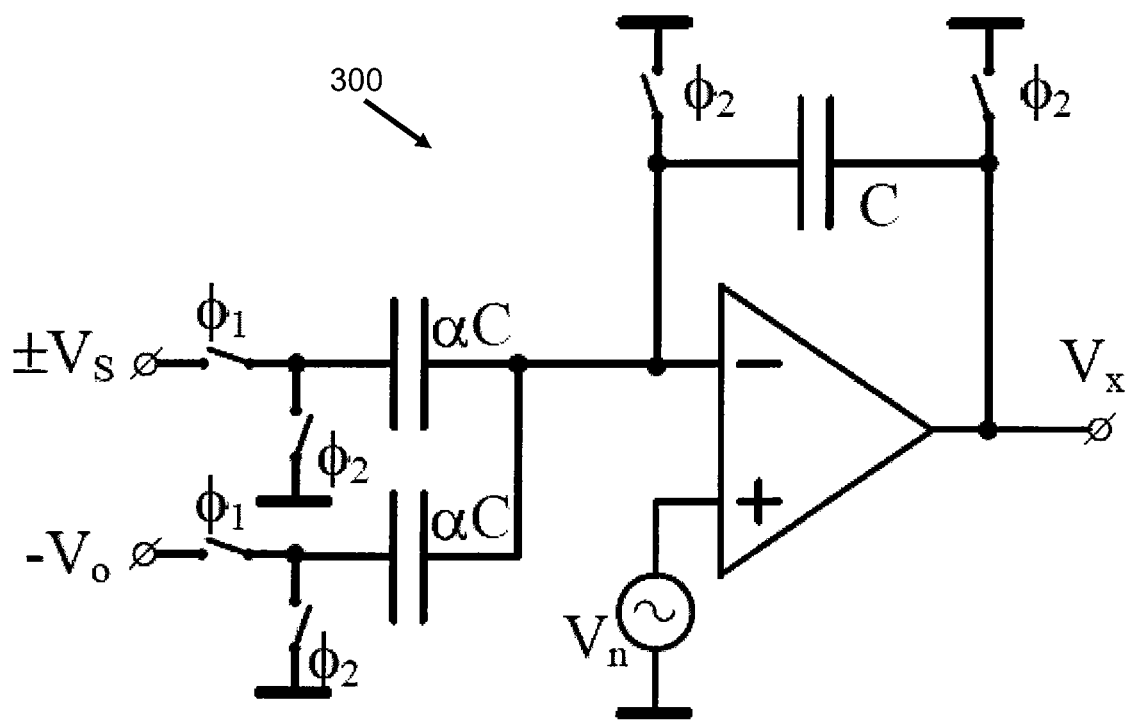
FIG. 3 is a schematic of an exemplary implementation of a summing amplifier implemented by an active circuit.

FIG. 3 shows an exemplary implementation of a summing amplifier 300 implemented by an active circuit that accepts input signals $V_S$ and $V_0$ and produces an output signal $V_X$. In this case, $V_S$ is the system reference voltage and $V_0$ is the system output voltage. The summing amplifier 300 also introduces an unwanted disturbance signal $V_n$ that is included in the output signal $V_X$. The offset cancellation has been omitted for simplicity. Conventional analysis of switched-capacitor amplifiers shows that the input signals $V_S$ and $V_0$ experience a gain "α" to the output, while the disturbance $V_n$ is amplified by $(1+2\alpha)/\alpha$.

Figure 4:
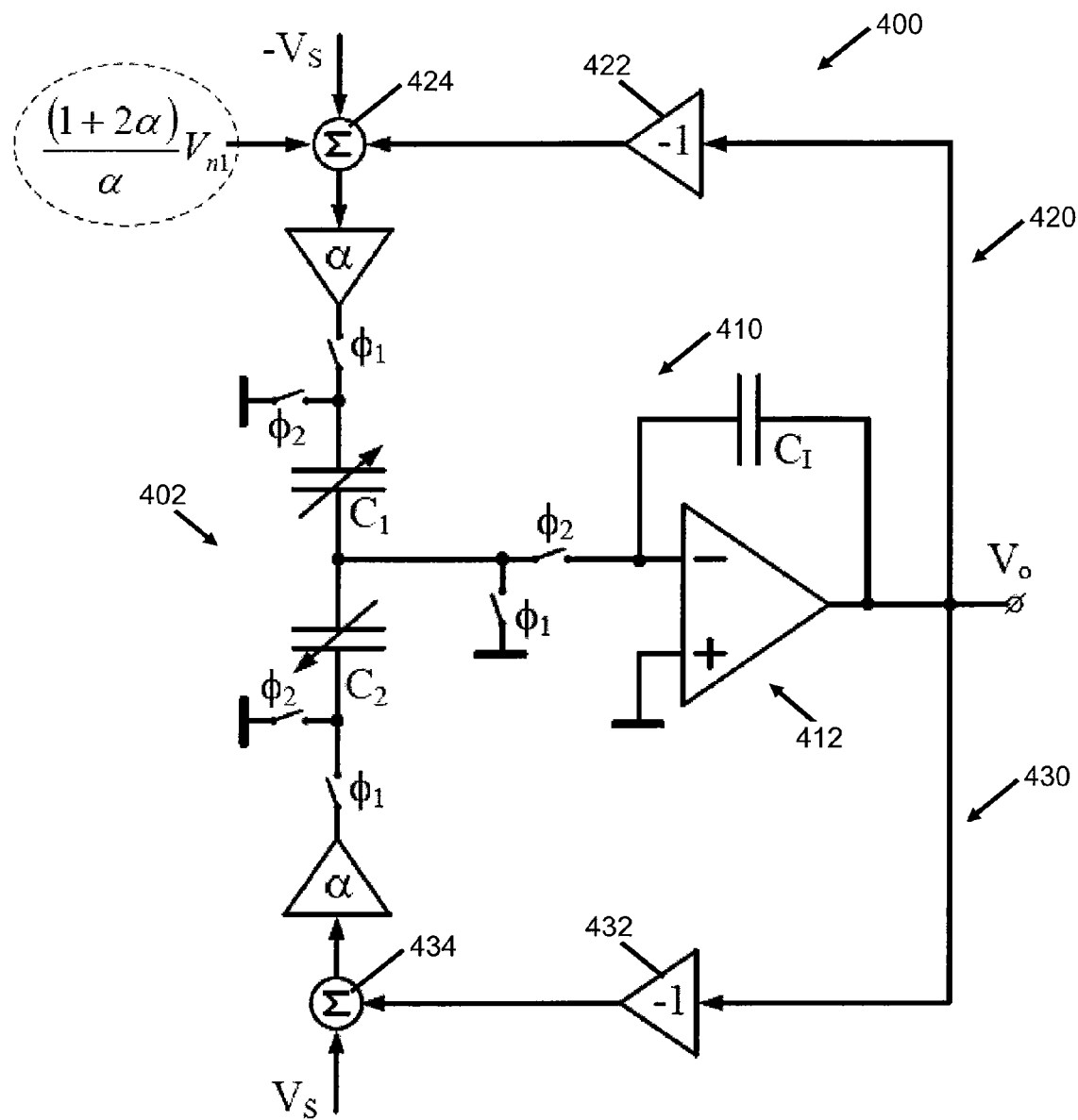
FIG. 4 is a schematic of an exemplary capacitive transducer system and illustrates the introduction of a disturbance $V_{n1}$ from one of the summing amplifiers.

FIG. 4 shows an exemplary capacitive transducer system 400 and illustrates the introduction of a disturbance $V_{n1}$ from one of the summing amplifiers. The system 400 includes a sensing element 402, a forward path 410 and two feedback paths 420, 430. The forward path 410 takes the output signal from the sensing element 402, passes it through a switched-capacitor integrator 412 and provides it as an output signal $V_0$. The integrator 412 can provide high gain to the signals passing through it in the forward path 410. Each of the feedback paths takes the output signal $V_0$ and feeds it back to the sensor element 402. The first feedback path 420 takes the output signal $V_0$, passes it through an inverting amplifier 422, and a summing amplifier 424. The summing amplifier 424 sums a negative reference voltage $-V_S$ with the inverted output signal $-V_0$ and introduces an unwanted disturbance signal $V_{n1}$, and outputs a first combined signal with the disturbance $V_{n1}$. The second feedback path 430 takes the output signal $V_0$, passes it through an inverting amplifier 432, and a summing amplifier 434. The summing amplifier 434 sums the positive reference voltage $V_S$ with the inverted output signal $-V_0$ and introduces another unwanted disturbance signal $V_{n2}$, and outputs a second combined signal with the disturbance $V_{n2}$. The transfer function of the system 400 for the reference voltage $V_S$ and the first disturbance $V_{n1}$ (ignoring the second disturbance $V_{n2}$) can be calculated as:

$$V_o = -V_S \frac{C_1 - C_2}{C_1 + C_2} + \frac{(1+2\alpha)}{\alpha} V_{n1} \frac{C_1}{C_1 + C_2} \quad (3)$$

For the particular case of α=1 and small displacements ($C_1 \approx C_2$), the reference voltage $V_S$ disappears and the disturbance $V_{n1}$ appears at the output with a gain of 3/2. Thus, this configuration of the summing amplifier does not provide the desired attenuation of the unwanted disturbances $V_n$.

Figure 5:
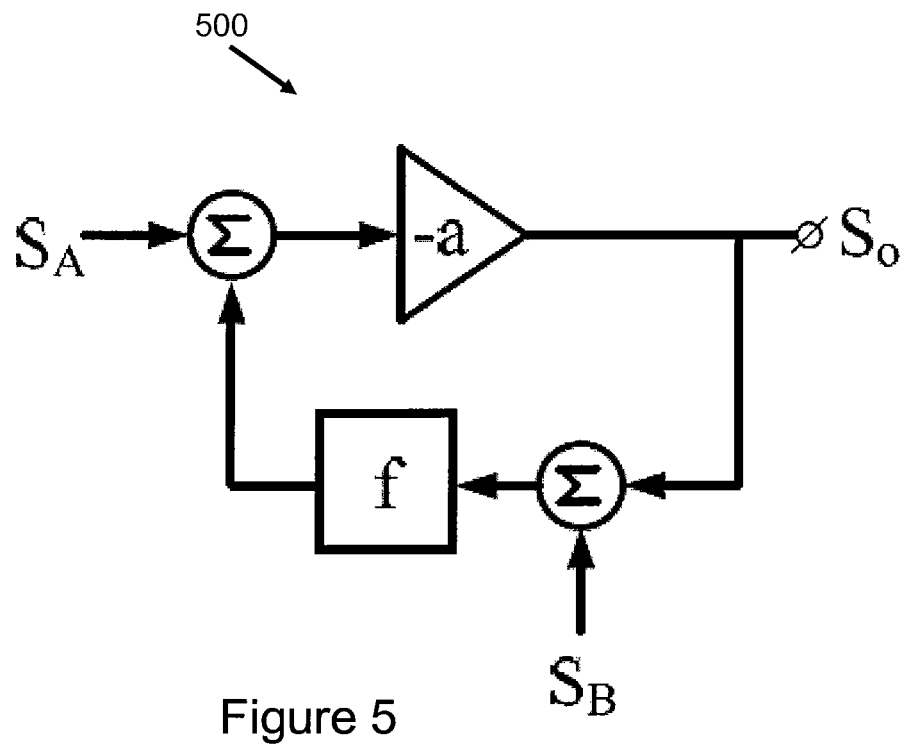
FIG. 5 shows a simplified feedback system corresponding to the system of FIG. 4.

FIG. 5 shows a simplified feedback system 500 corresponding to the system 400 of FIG. 4. The system 500 has forward-path gain "a" and feedback coefficient "f". The feedback system 500 has two inputs, $S_A$ and $S_B$, and an output $S_O$. The input signal $S_B$ is introduced in the feedback path, and both input signals $S_A$ and $S_B$ are amplified by the high-gain block "a". The transfer function for system 500 is:

$$S_o = -\frac{a}{1+af} S_A - \frac{af}{1+af} S_B \quad (4)$$

In a typical feedback system a>>1 and f<=1. For the case of f=1, the transfer function for the system 500 simplifies to:

$$S_O \approx -S_A - S_B \quad (5)$$

We see that in the system 500 both $S_A$ and $S_B$ appear at the output with equal weight. If $S_A$ is the signal we are interested in and $S_B$ is an unwanted disturbance, then we are not achieving the desired attenuation of the unwanted disturbance $S_B$ in the feedback system 500.

Figure 6:
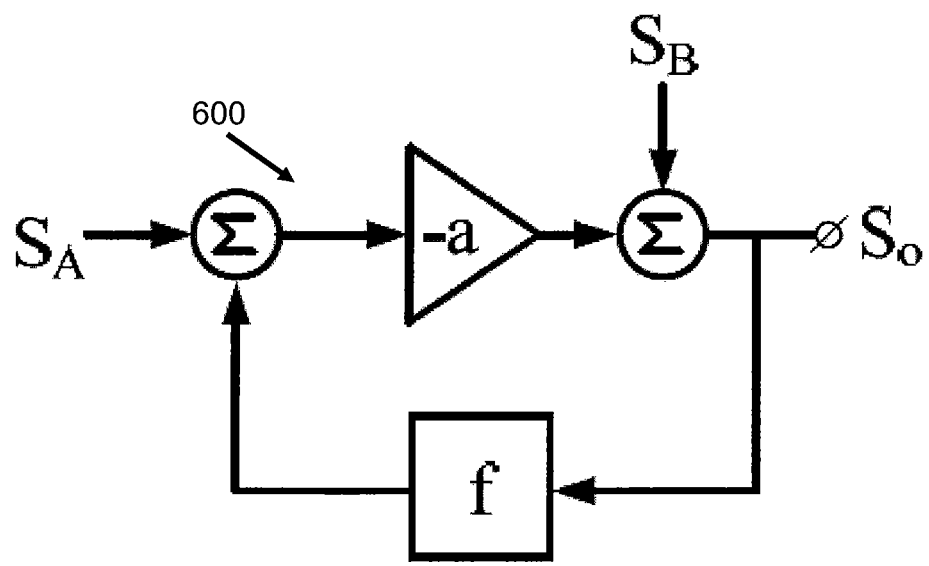
FIG. 6 shows a feedback system with a first input signal $S_A$ that is amplified by forward-path gain block "a" and a second input signal $S_B$ that is introduced in the forward path after the gain block "a"

FIG. 6 shows another feedback system 600 that has forward-path gain "a" and feedback coefficient "f". The system 600 also has two inputs, $S_A$ and $S_B$, and an output $S_O$. However in the system 600, unlike the system 500, the input signal $S_B$ is introduced in the forward path after the high-gain block "a". The transfer function of the system 600 is:

$$S_o = -\frac{a}{1+af} S_A + \frac{1}{1+af} S_B \quad (6)$$

Again assuming a>>1 and f=1, the transfer function of the system 600 simplifies to:

$$S_O \approx S_A + (1/a) S_B \quad (7)$$

Eq. (7) shows that the signal $S_A$, introduced before the high-gain block "a", appears directly at the output, while the signal $S_B$, introduced after the high-gain block, is highly attenuated. Thus, it would be desirable to attenuate the disturbances introduced by the summing amplifiers of the measurement circuit before they reach the output, like the signal $S_B$, instead of allowing these disturbances to reach the output largely unattenuated, like the signal $S_A$, to reduce the impact of these disturbances on the measurements of the system.

Comparing equations (5) and (7) we see that in the system 500 the unwanted signal $S_B$ will appear directly at the output with the same attenuation as the useful signal $S_A$, while in the system 600 the unwanted signal $S_B$ will be attenuated by a>>1 without attenuation of the useful signal $S_A$. Therefore, it would be desirable to implement a system that attenuates the unwanted disturbances like the system 600.

In the feedback systems of FIGS. 2 and 4, the summing amplifiers appear in the feedback path. Therefore, the disturbance $V_n$ introduced by the summing amplifiers behaves similarly to $S_B$ in FIG. 5 and is amplified by the high gain in the forward path. The feedback system of FIG. 4 can be redesigned in a way that makes the disturbance $V_n$ behave similarly to $S_B$ of FIG. 6, and therefore does not amplify the disturbance $V_n$ by the high gain in the forward path. This can be achieved by placing the summing amplifiers in the forward path of the feedback system after the high gain block.

Figure 7:
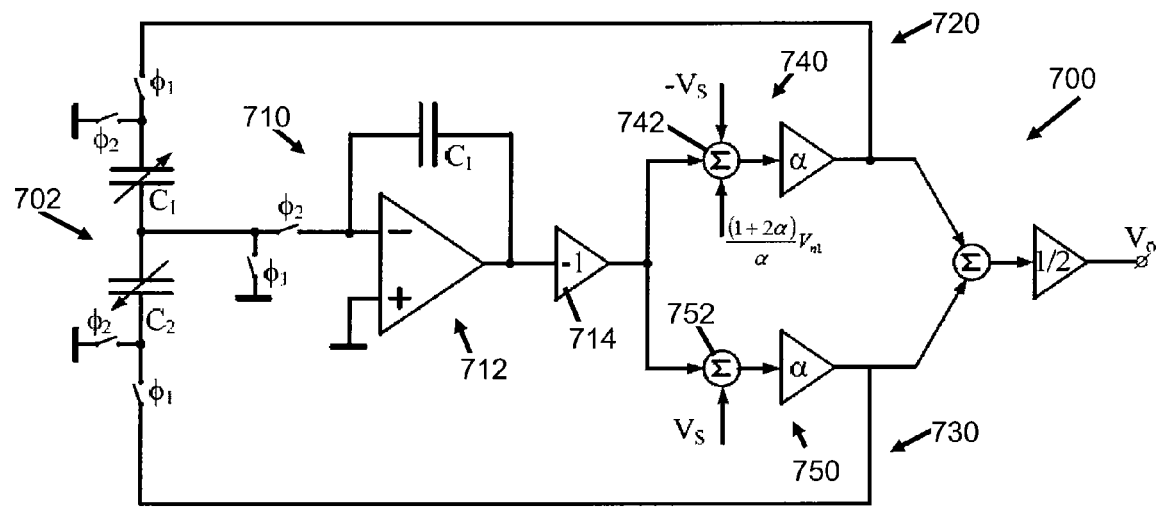
FIG. 7 is a schematic of an exemplary capacitive transducer system in which the summing amplifiers are located in the forward path of the system after the high gain of the switched-capacitor integrator.

FIG. 7 shows an exemplary system 700 in which the summing amplifiers are located in the forward path of the system after the high gain of the switched-capacitor integrator. The system 700 includes a sensing element 702, a forward path 710 and two feedback paths 720, 730. The forward path 710 takes the output signal from the sensing element 702, passes it through a switched-capacitor integrator 712 and an inverting amplifier 714 and produces an intermediate output signal $V_0'$, then the forward path 710 splits into a first branch 740 and a second branch 750. The first branch 740 takes the intermediate output signal $V_0'$ and passes it to a summing amplifier 742. The summing amplifier 742 sums a negative reference voltage $-V_S$ with the intermediate output signal $V_0'$ and introduces an unwanted disturbance signal $V_{n1}$, and outputs a first combined signal $V_0'-V_S$ which includes the disturbance $V_{n1}$. The second branch 750 takes the intermediate output signal $V_0'$ and passes it to a summing amplifier 752. The summing amplifier 752 sums the positive reference voltage $V_S$ with the intermediate output signal $V_0'$ and introduces an unwanted disturbance signal $V_{n2}$, and outputs a second combined signal $V_0'+V_S$ which includes the disturbance $V_{n2}$. The output signals of the first branch 740 and the second branch 750 are combined and halved to provide an output signal $V_0$. The first feedback path 720 takes the output signal $V_0'-V_S$ from the first branch 740 and feeds it back to the sensor element 702. The second feedback path 730 takes the output signal $V_0'+V_S$ from the second branch 750 and feeds it back to the sensor element 702. The first and second branches 740, 750 of the forward path 710 also show a summing amplifier gain $\alpha$.

The integrator 712 can provide high gain to the signals passing through it in the forward path 710. Like the feedback system 600, the unwanted disturbances are introduced in the forward path 710 after the integrator 712. The transfer function for the signal and first branch disturbance in the system 700 is:

$$V_{o\_new} = \alpha V_S \frac{C_1 - C_2}{C_1 + C_2} - \frac{(1+2\alpha)}{2} V_{n1} \frac{C_1 - C_2}{C_1 + C_2} \qquad (8)$$

After normalizing the output of the systems in FIGS. 4 and 7 to the same signal level (first terms in Eq. (3) and Eq. (8)), the relative contribution of the disturbance $V_{n1}$ (second term in Eq. (3) and Eq. (8)) to the output of the two systems can be calculated. as:

$$\frac{V_{o\_n1\_new}}{V_{o\_n1\_old}} = \frac{\frac{(1+2\alpha)}{2} V_{n1} \frac{C_1-C_2}{C_1+C_2}}{\alpha \frac{(1+2\alpha)}{\alpha} V_{n1} \frac{C_1}{C_1+C_2}} = \frac{C_1-C_2}{2C_1} \qquad (9)$$

The following numerical example shows the additional attenuation of the disturbance in the system 700 of FIG. 7 versus the system 400 of FIG. 4. A parallel-plate transducer (for example, an accelerometer) can have a typical maximum signal level of $(C_1-C_2)/(C_1+C_2)=0.2$. This relationship can be rearranged to yield $C_1=(3/2)C_2$, and substituting this into Eq. (9) yields $V_{o\_n1\_new}/V_{o\_n1\_old}=1/6$. Thus, the system 700 attenuates the contribution of the summing amplifier disturbance $V_{n1}$ by a factor of 6 relative to the system 400. This analysis naturally applies to the disturbances introduced by both summing amplifiers.

Figure 8:
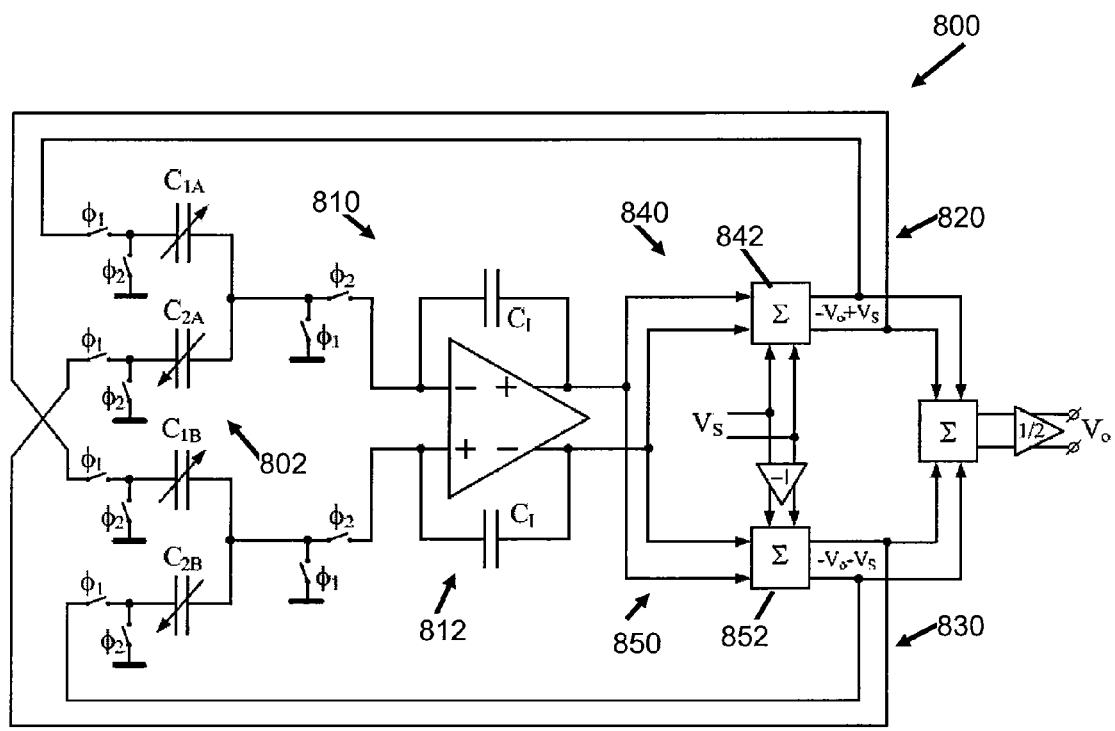
FIG. 8 is a schematic of an exemplary fully-differential capacitive feedback system in which the summing amplifiers are located in the forward path of the system after the high gain block.

Placement of summing amplifiers in the forward path of a capacitive feedback system after a high gain block can also be done in a fully-differential system, such as the exemplary system 800 shown in FIG. 8. The system 800 includes a sensing element 802, a dual forward path 810 and two dual feedback paths 820, 830. In the system 800, the transducer 802 is implemented as two separate cores. A first core $C_1$ includes variable capacitors $C_{1A}$ and $C_{1B}$, a second core $C_2$ includes variable capacitors $C_{2A}$ and $C_{2B}$. The corresponding capacitors of the two cores react to the input signal in a substantially identical way (i.e., $C_{1A}=C_{1B}$ and $C_{2A}=C_{2B}$). However, the electrical signals processed by the two cores have opposite polarity.

The forward path 810 takes the output signals from the cores of the sensing element 802, passes them through a capacitor integrator 812 and produces intermediate output signals, then the forward path 810 splits into a first branch 840 and a second branch 850. Unlike the switched-capacitor integrator 712 depicted in FIG. 7 wherein the integrator 712 is a single-ended amplifier, the capacitor integrator 812 depicted in FIG. 8 is a fully differential amplifier. Thus, the capacitor integrator 812 does not require a separate inverting amplifier. The first branch 840 takes a first intermediate output signal and passes it to a summing amplifier 842. The summing amplifier 842 sums a positive reference voltage $V_S$ with the first intermediate output signal and introduces unwanted disturbances $V_{n1}$, and outputs a first combined signal $-V_0+V_S$ which includes the disturbances $V_{n1}$. The second branch 850 takes an intermediate output signal and passes it to a summing amplifier 852. The summing amplifier 852 sums the inverted reference voltage $-V_S$ with the intermediate output signal and introduces unwanted disturbances $V_{n2}$, and outputs a second combined signal $-V_0-V_S$ which includes the disturbances $V_{n2}$. The output signals of the first branch 840 and the second branch 850 are combined and halved to provide an output signal $V_0$. The first feedback path 820 takes the output signal $-V_0+V_S$ from the first branch 840 and feeds it back to the sensor element 802. The second feedback path 830 takes the output signal $-V_0-V_S$ from the second branch 850 and feeds it back to the sensor element 802. The system 800 assumes summing amplifier gain $\alpha=1$ for simplicity, however the principle applies to the general case as well.

Like the system 700, the output signals from the cores of the sensing element 802 pass through the integrator 812 which can provide high gain, but the unwanted disturbances from the summing amplifiers 842, 852 do not pass through the integrator 812 in the forward path 810. Thus the unwanted disturbances from the summing amplifiers are highly attenuated.

While this invention has been described as having an exemplary design, the present invention may be further modified within the spirit and scope of this disclosure. This application is therefore intended to cover any variations, uses, or adaptations of the invention using its general principles.

We claim:

1. A differential capacitive transducer system comprising:
   a first capacitive core configured to generate a first core output signal based on a physical input;
   a second capacitive core configured to generate a second core output signal based on the physical input;
   a first feed-forward path having a high gain circuit element configured to (i) receive the first and second core output signals, and (ii) generate an amplified transducer signal based on the first and second core output signals;
   a second feed-forward path extending from the first feed-forward path, the second feed-forward path having a first summing amplifier configured to generate a first summation signal based on the amplified transducer signal and a non-inverted reference voltage;
   a third feed-forward path extending from the first feed-forward path, the third feed-forward path having a second summing amplifier configured to generate a second summation signal based on the amplified transducer signal and an inverted reference voltage, the inverted reference voltage having substantially the same magnitude and opposite polarity as the non-inverted reference voltage;
   a first feedback path extending from the second feed-forward path, the first feedback path being configured to feed back the first summation signal to each of the first and second capacitive cores;
   a second feedback path extending from the third feed-forward path, the first feedback path being configured to feed back the second summation signal to each of the first and second capacitive cores; and
   output circuitry configured to sum the second and third feed-forward paths and generate a transducer output signal based on the first and second summation signals.

2. The differential capacitive transducer system of claim 1, wherein the high gain circuit element is a switched capacitor integrator.

3. The differential capacitive transducer system of claim 1, wherein the high gain circuit element includes an inverting input and a non-inverting input, the first core output signal being input to the inverting input, and the second core output signal being input to the non-inverting input of the high gain circuit element.

4. The differential capacitive transducer system of claim 3, wherein the high gain circuit element further generates an inverted amplified transducer signal, the inverted amplified transducer signal having substantially the same magnitude and opposite polarity as the amplified transducer signal, the inverted amplified transducer signal being input to each of the first and second summing amplifiers.

5. The differential capacitive transducer system of claim 1, wherein each of the first and second summing amplifiers includes an operational amplifier.

6. The differential capacitive transducer system of claim 1, wherein the output circuitry generates the transducer output signal as the average of the first summation signal and the second summation signal.

7. The differential capacitive transducer system of claim 1, wherein
   the first capacitive core comprises a first variable capacitor and a second variable capacitor, the first variable capacitor including a first stationary capacitive plate and a first movable capacitive plate, and the second variable capacitor including a second stationary capacitive plate and a second movable capacitive plate, the first movable capacitive plate being coupled to the second movable capacitive plate and forming a first common node; and
   the second capacitive core comprises a third variable capacitor and a fourth variable capacitor, the third variable capacitor including a third stationary capacitive plate and a third movable capacitive plate, and the fourth variable capacitor including a fourth stationary capacitive plate and a fourth movable capacitive plate, the third movable capacitive plate being coupled to the fourth movable capacitive plate and forming a second common node.

8. The differential capacitive transducer system of claim 7, wherein the first variable capacitor of the first capacitive core reacts to the physical input substantially that same as the third variable capacitor of the second capacitive core, and the second variable capacitor of the first capacitive core reacts to the physical input substantially that same as the fourth variable capacitor of the second capacitive core.

9. The differential capacitive transducer system of claim 8, wherein the high gain circuit element includes an inverting input and a non-inverting input, the inverting input being coupled to the first common node for receiving the first core output signal, and the non-inverting input being coupled to the second common node for receiving the second core output signal.

10. The differential capacitive transducer system of claim 9, wherein the high gain circuit element further generates an inverted amplified transducer signal, the inverted amplified transducer signal having substantially the same magnitude and opposite polarity as the amplified transducer signal, the inverted amplified transducer signal being input to each of the first and second summing amplifiers;
    the first summing amplifier generates the first summation signal also based on the inverted amplified transducer signal; and
    the second summing amplifier generates the second summation signal also based on the inverted amplified transducer signal.

11. The differential capacitive transducer system of claim 10, wherein the first feedback path feeds back the first summation signal to the first stationary capacitive plate of the first capacitive core and to the third stationary capacitive plate of the second capacitive core; and the second feedback path feeds back the second summation signal to the second stationary capacitive plate of the first capacitive core and to the fourth stationary capacitive plate of the second capacitive core.

12. The differential capacitive transducer system of claim 11, wherein the output circuitry generates the transducer output signal based on the average of the first and second summation signals.

13. A method of forming a readout circuit for a capacitive transducer having first and second inputs and a transducer output, the method comprising:
    coupling the transducer output to an amplifier input of a high gain circuit element;
    coupling an amplifier output of the high gain circuit element to a first signal input of a first summing amplifier;
    coupling the amplifier output of the high gain circuit element to a second signal input of a second summing amplifier;
    providing a reference voltage input to the first summing amplifier;

providing an inverted reference voltage input to the second summing amplifier;

feeding back a first summation output of the first summing amplifier to the first input of the capacitive transducer;

feeding back a second summation output of the second summing amplifier to the second input of the capacitive transducer; and coupling output circuitry for generating a readout circuit output signal to the first summation output of the first summing amplifier and to the second summation output of the second summing amplifier.

14. The method of claim 13, wherein the high gain circuit element is a switched capacitor integrator.

15. The method of claim 13, wherein each of the first and second summing amplifiers includes an operational amplifier.

16. The method of claim 13, further comprising coupling the amplifier output of the high gain circuit element to an input of an inverter and coupling an output of the inverter to the first signal input of the first summing amplifier and to the second signal input of the second summing amplifier.

17. A method of forming a readout circuit for a differential capacitive transducer comprising a first capacitive core for generating a first core output signal based on a physical input and a second capacitive core for generating a second core output signal based on the physical input, the method comprising:

coupling a high gain circuit element to the first and second capacitive cores to generate an amplified transducer signal based on the first and second core output signals;

coupling the high gain circuit element to a first signal input of a first summing amplifier and to a second signal input of a second summing amplifier;

providing a reference voltage input to the first summing amplifier;

providing an inverted reference voltage input to the second summing amplifier;

feeding back a first summation output of the first summing amplifier to each of the first and second capacitive cores;

feeding back a second summation output of the second summing amplifier to each of the first and second capacitive cores; and coupling output circuitry for generating a readout circuit output signal to the first summation output of the first summing amplifier and to the second summation output of the second summing amplifier.

18. The method of claim 17, wherein the high gain circuit element includes an inverting input, a non-inverting input, an inverted output, and a non-inverted output, the method further comprising:

coupling the inverting input of the high gain circuit element to the first capacitive core;

coupling the non-inverting input of the high gain circuit element to the second capacitive core;

coupling the inverted and non-inverted outputs of the high gain circuit element to the first summing amplifier; and coupling the inverted and non-inverted outputs of the high gain circuit element to the second summing amplifier.

19. The method of claim 18, wherein each of the first and second summing amplifiers includes an operational amplifier.

20. The method of claim 18, wherein the first capacitive core comprises a first variable capacitor and a second variable capacitor, the first variable capacitor including a first stationary capacitive plate and a first movable capacitive plate, and the second variable capacitor including a second stationary capacitive plate and a second movable capacitive plate, the first movable capacitive plate being coupled to the second movable capacitive plate and forming a first common node for providing the first core output signal; and the second capacitive core comprises a third variable capacitor and a fourth variable capacitor, the third variable capacitor including a third stationary capacitive plate and a third movable capacitive plate, and the fourth variable capacitor including a fourth stationary capacitive plate and a fourth movable capacitive plate, the third movable capacitive plate being coupled to the fourth movable capacitive plate and forming a second common node for providing the second core output signal;

the method further comprising:

coupling the inverting input of the high gain circuit element to the first common node of the first capacitive core;

coupling the non-inverting input of the high gain circuit element to the second common node of the second capacitive core;

feeding back the first summation output of the first summing amplifier to the first stationary capacitive plate of the first capacitive core and to the third stationary capacitive plate of the second capacitive core; and feeding back the second summation output of the second summing amplifier to the second stationary capacitive plate of the first capacitive core and to the fourth stationary capacitive plate of the second capacitive core.

* * * * *